United States Patent
Sugiura et al.

[11] 3,788,731
[45] Jan. 29, 1974

[54] TWO POINT FOCUS VARIABLE MAGNIFICATION LENS SYSTEM

[75] Inventors: Muneharu Sugiura; Ryusho Hirose, both of Tokyo, Japan

[73] Assignee: Canon Kabushiki Kaisha, Tokyo, Japan

[22] Filed: July 14, 1972

[21] Appl. No.: 272,071

[30] Foreign Application Priority Data
July 19, 1971 Japan.................................. 46/53100

[52] U.S. Cl. ............................................... 350/184
[51] Int. Cl. ........................................... G02b 15/14
[58] Field of Search ...................................... 350/184

[56] References Cited
FOREIGN PATENTS OR APPLICATIONS
1,067,428   5/1967   Great Britain....................... 350/184

Primary Examiner—Paul A. Sacher
Attorney, Agent, or Firm—Toren & McGeady

[57] ABSTRACT

A two point focus variable magnification lens system which can be focussed at two points, the minimum and maximum focal lengths with different magnifications by the movement of the only second lens groups, and which when focussed at the minimum focal length of the maximum focal length can be made to focus for an object at either of special two distances without performing the focussing operation as far as the following conditions are satisfied, $$-\frac{1}{s_2} + \frac{1}{x+y} = \frac{1}{f_1}$$

$$|f_1| = \frac{\left(\xi_0 + f_2 \frac{1+K}{K} - 1_n\right)s_1}{s_1 + f_2 \frac{1+K}{K} + \xi_0 - 1_n}$$

wherein $f_1$ is the focal length of the first lens group, $f_2$ is the focal length of the second lens group, $s_1$ is the distance of a special farther side of objects from the front end of the lens system in the case of the minimum focal length, $s_2$ is the distance of a special nearer side of objects from the front end of the lens system, $\xi_0$ is the displacement length of the second lens group, $K=1/\sqrt{z}$ ($z$: the variation ratio of magnification), $l_n$ is the interval between the principal points of the first and second lens groups in the case of the maximum focal length, $x$ is the distance from the front principal point of the first lens group to the point of image formed of an object at a special farther side by the first lens group in the case of the minimum focal length, and $y$ is $f_2(1 - K)^2/k$.

8 Claims, 8 Drawing Figures

TWO POINT FOCUS VARIABLE MAGNIFICATION LENS SYSTEM

The photographic optical system for use in video-telephones and the like will owe an advantage, if the focussing for objects, for example, the face and figure of an interlocutor and documents at different distances are effected with different magnifications. The present invention relates to a simple variable magnification lens system suitable for use with such a purpose which can be focussed at special two points with different magnifications.

The generally available variable magnification lens is the so-called zoom lens of continuously variable magnification. The zoom lens which is made the most present use of comprises four lens group I, II, III, IV having respectively collective, dispersive, collective and collective refraction powers arranged in order from the object side, the first lens group I being movable for the exclusive use in focussing, the second lens group II being straightforwardly movable so as to vary the magnification, the third lens group III being displaced back and forth by the one-direction movement of the second lens group II to compensate the displacement of location of the image caused by the movement of the second lens group II, and the fourth group IV being fixed as a relay lens that focuses the image of objects on the surface of the film. However, such a zoom lens has so complicated structure and is so expensive that it is unsuitable for use in video-telephones and the like.

In addition, there is another relatively simple zoom lens as shown in FIG. 2a, which comprises three lens groups having respectively dispersive, collective and collective refraction powers, the second lens group II being movable to vary the magnification, the first group for focussing being movable during zooming so as to compensate the displacement of the image position caused by the movement of the second lens group, and the third lens group III being fixed as a relay lens. In these zoom lenses, the first lens group I focuses for object P at position $P_1$ the image of P which is transferred to position $P_2$ by the second lens group II as shown in FIG. 2b when the focal length is minimum. The third lens group II finally focuses the image on a focussing plane. In the case of an intermediate focal length, the image which is to be formed at position $P_1$ in the case as shown in FIG. 2b is transferred to a position $P_2'$ deviated from position $P_2$. Therefore, in order to compensate the displacement of the focussing plane caused by the movement of the second lens group II, the first lens group I is allowed to move to such a position as indicated by the solid line figure to transfer the image from position $P_1$ to position $P_1'$, thus the image focussed through the second lens group II maintains a fixed position $P_2$. However, such a zoom lens also requires two movable members for adjustment and its structure is still complicated enough to be applied for the above-mentioned purpose to video-telephones and the like.

The present invention though based on such a zoom lens as exampified in FIG. 2 has only one movable member to effect the focussing at only two points with different magnifications, so that a simple variable magnification lens suitable for use in video-telephones results, which comprises three lens groups I, II, III, having respectively dispersive, collective and collective refraction powers, the first lens group I being fixed, the second lens group II being movable so as to vary the magnification and the third lens group III being fixed as a relay lens, thereby the different magnifications can be selected at two different points, viz., the minimum and maximum focal lengths by the movement of the only second lens group, and the lens system can be focussed at the minimum focal length or the maximum focal length each for their respective objects present at two special distances without performing the focussing operation, so far as the following conditions are satisfied.

$$-\frac{1}{s_2}+\frac{1}{x+y}=\frac{1}{f_1}\ |f_1|=\frac{\left(\xi_0+f_2\frac{1+K}{K}-1_n\right)s_1}{s_1+f_2\frac{1+K}{K}+\xi_0-1_n}$$

wherein
- $f_1$: The focal length of the first lens group
- $f_2$: the focal length of the second lens group
- $s_1$: the distance of a special farther side of objects from the front end of the lens system when focussed at the minimum focal length
- $s_2$: the distance of a special nearer side of objects from the front end of the lens system when focussed at the maximum focal length
- $\xi_0$: the displacement length of the second lens group
- $K = 1/\sqrt{z}$ ($z$: the variation ratio of magnification)
- $l_n$: the interval between the principal points of the first and second lens groups
- $x$ : the distance from the front principal point of the first lens group to the position of the image formed of a special farther side of objects by the first lens group.
- $y$ : $[f_2(1-K)^2]/K$ In the above-mentioned lens system when focussed at the minimum focal length, by the first lens group I the rays issuing from an object Q present at a distance $s_1$ from the front end of the first lens group I at first form an image at the position of $Q_1$, thereby the following equation derived from the elementary optical relations is satisfied.

$$-1/s_1 + 1/x = 1/f_1 \qquad (1)$$

This image is then transferred by the second lens group II and focussed again on position $Q_2$ through the third lens group III. On the other hand, when the lens system is focussed at the maximum focal length by moving the second lens group II in such a way as shown in FIG. 3b while fixing the first lens group I, the rays issuing from an object Q' present at a distance $s_2$ ( $|s_2|<|s_1|$ ) from the front end of the first lens group I at first form an image on the position of $Q_1'$ by the first lens group I, thereby the relation $$-1/s_2 + 1/(x+y) = 1/f_1$$

should be satisfied likewise as in the case of the above-mentioned minimum focal length. In this case, y not only refers to the value $f_2[(1-K)^2]/K$ as defined above, but also corresponds to $\overline{Q_1Q_1'}$. In the case of the maximum focal length as well as in the case of the minimum focal length, the image $Q_1'$ must be focussed on the same position $Q_2$ as shown in FIG. 3a. To make this requirement possible, however, the following conditions should be satisfied.

$$D = -f_2 (1 + K)/(K)$$
$$x = D + l_1 = D + l_n - \xi_0$$

wherein $l_1$ is the interval between the principal points of the first and second lens groups, and D is the distance from the front principal point of the second lens group II to $Q_1$. By combining these equations with the above-mentioned equation (1) and solving for $f_1$ in relation to $f_2$, there results $$f_1 = \frac{\left(\xi_0 + f_2 \frac{1+K}{K} - 1_n\right) S_1}{s_1 + f_2 \frac{1+K}{K} + \xi_0 - 1_n}$$

This condition when satisfied allows image $Q_1'$ to be focussed on position $Q_2$.

As mentioned above, although the variable magnification lens system of the present invention has restrictions in the focussing position and the magnification with special two values, however, its simple construction and the movement of only one member, the second lens group II, are enough for fulfilling the necessary purpose, and, moreover, the both focussing planes which are effected for objects at necessary distances with the predetermined focal lengths can be prevented automatically from displacing from each other.

In this connection, in applying the lens system to a video-telephone, it is preferable that $s_1 = 0.8$ meter with the focal length $f = 17$ millimeters when photographing the face and figure of an interlocutor, while when photographing documents and the like, $s_2 = 0.4$ meter with the focal length $f = 25$ millimeters. Further the first lens group I should be fixed as a rule, but there may be considered a case where documents such as very thick books are placed at a certain position on a desk, so that the first lens group may be so constructed as to move to be focussed for them by a single fine adjustment. By the way, as the distance of an object (for example, in the case of very thick books) decreases, the first lens group should be drawn forwards. When the interlocutor is farther than a certain distance from the lens, the first lens group should be slightly displaced backwards to effect the focussing coincidence.

FIG. 4 shows an example of the component diagrams of the variable magnification lens system of the present invention, the values of all the components being listed in the following.

r: Radii of curvatures of the refraction surfaces in sequence
d: Axial widths or air distances of the lens components in sequence
N: Refractive indices of the glasses of the lens components in sequence
V: Abbe's numbers of the same glasses as just above in sequence
Focal length $f = 17.5$ mm (Object distance $s_1 = 0.8$ m)
$f = 25.1$ mm (object distance $s_2 = 0.4$ m)
Variation ratio of magnification = 1.45
Aperture ratio = 1 : 2

$r_1 = 64.018$
$d_1 = 2.0$, $N_1 = 1.62041$, $V_1 = 60.2$
$r_2 = 30.422$
$d_2 = 2.0$
$r_3 = 65.643$
$d_3 = 4.5$, $N_2 = 1.65844$, $V_2 = 50.8$
$r_4 = -87.374$
$d_4 = 2.0$, $N_3 = 1.74000$, $V_3 = 28.2$
$r_5 = 90.547$
$d_5 = $ variable
$r_6 = 37.646$
$d_6 = -4.0$, $N_4 = 1.62230$, $V_4 = 53.1$
$r_7 = -366.922$
$d_7 = 1.0$, $N_5 = 1.74077$, $V_5 = 27.7$
$r_8 = 123.847$
$d_8 = 0.2$
$r_9 = 82.098$
$d_9 = 3.0$, $N_6 = 1.51633$, $V_6 = 64.0$
$r_{10} = -82.577$
$d_{10} = $ variable
$r_{11} = -13.258$
$d_{11} = 2.5$, $N_7 = 1.71300$, $V_7 = 53.1$
$r_{12} = -11.280$
$d_{12} = 2.0$
$r_{13} = -7.888$
$d_{13} = 5.0$, $N_8 = 1.78472$, $V_8 = 25.6$
$r_{14} = -10.078$
$d_{14} = 0.2$
$r_{15} = 11.548$
$d_{15} = 2.0$, $N_9 = 1.73500$, $V_9 = 49.7$
$r_{16} = 9.466$
$d_{16} = 2.0$
$r_{17} = 27.672$
$d_{17} = 2.5$, $N_{10} = 1.67790$, $V_{10} = 50.6$
$r_{18} = -51.809$ Said variable air distance being:

When $f = 17.5$
$d_5 = 20.803$
$d_{10} = 4.5$

When $f = 25.1$
$d_5 = 4.263$
$d_{10} = 21.040$

EXAMPLE 2 r: Radii of curvatures of the refraction surfaces in sequence
d: Axial widths or air distances of the lens components in sequence
N: Refractive indices of the glasses of the lens components in sequence
V: Abbe's numbers of the same glasses as above in sequence
Focal length: $f = 17.5$ mm (Object distance: $s_1 = 0.8$ m)
$f = 25.32$ mm (Object distance: $s_2 = 0.4$m)
Variation ratio of magnification = 1.45
Aperture ratio = 1 : 2.8

$r_1 = 43.605$
$d_1 = 1.5$, $N_1 = 1.62004$, $V_1 = 36.3$
$r_2 = 25.3206$ $d_2 = $ variable
$r_3 = 34.6907$
$d_3 = 6.0$, $N_2 = 1.69100$, $V_2 = 54.8$
$r_4 = -32.719$
$d_4 = 1.4$, $N_3 = 1.59270$, $V_3 = 35.6$
$r_5 = -490.6$
$d_5 = $ variable
$r_6 = -5.7813$
$d_6 = 3.3$, $N_4 = 1.72825$, $V_4 = 28.5$
$r_7 = -7.682$
$d_7 = 0.2$
$r_8 = 16.579$
$d_8 = 2.5$, $N_5 = 1.71300$, $V_5 = 54.0$
$r_9 = -19.4325$
$d_9 = 3.2$
$r_{10} = -11.067$ $d_{10} = 1.5$, $N_6 = 1.72825$, $V_6 = 28.5$
$r_{11} = 11.577$
$d_{11} = 0.85$
$r_{12} = 15.839$
$d_{12} = 3.9$, $N_7 = 1.62041$, $V_7 = 60.13$
$r_{13} = -15.839$ Said variable air distance being:

When $f = 17.5$     When $f = 25.32$ $d_2 = 19.740$      $d_2 = 4.303$
$d_3 = 5.0$      $d_5 = 20.437$

Figure 1:
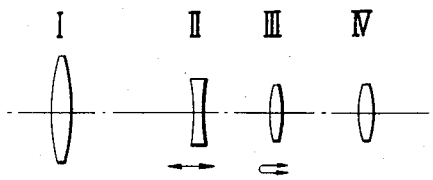
FIG. 1 is an explanatory drawing of a conventional zoom lens consisting of four groups.
Figure 2A:
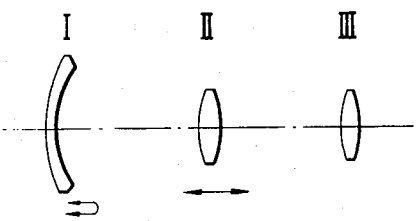
FIG. 2a is an explanatory drawing of a conventional zoom lens consisting of three groups.
Figure 2B:
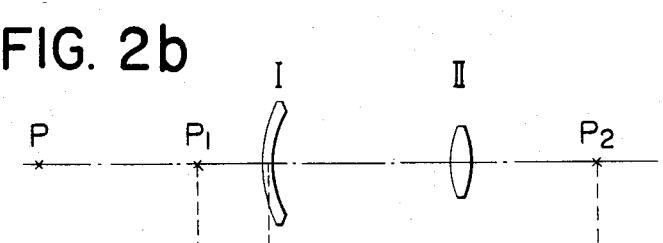
FIGS. 2b and 2c are drawings for explaining the operation of the above-mentioned zoom lens.
Figure 2C:
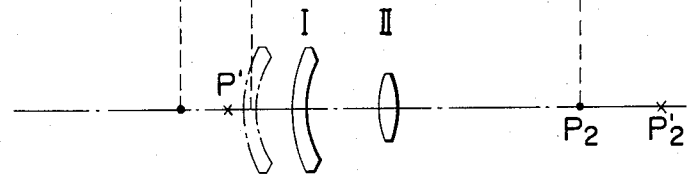
Figure 3A:
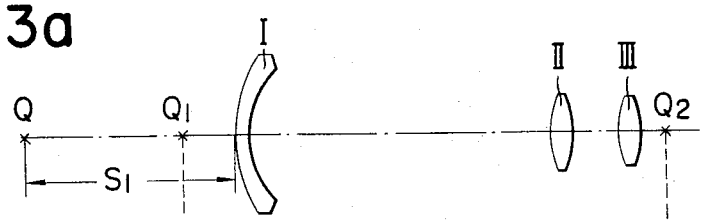
FIGS. 3a and 3b are drawings for explaining the operation of the variable magnification lens system of the present invention.
Figure 3B:
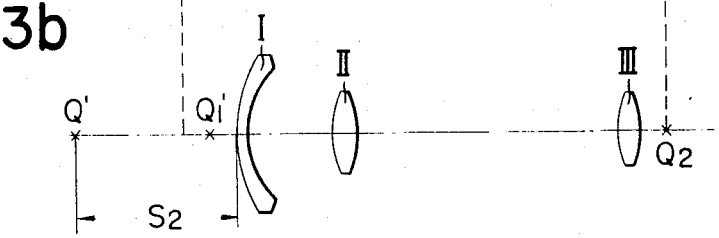
Figure 4:
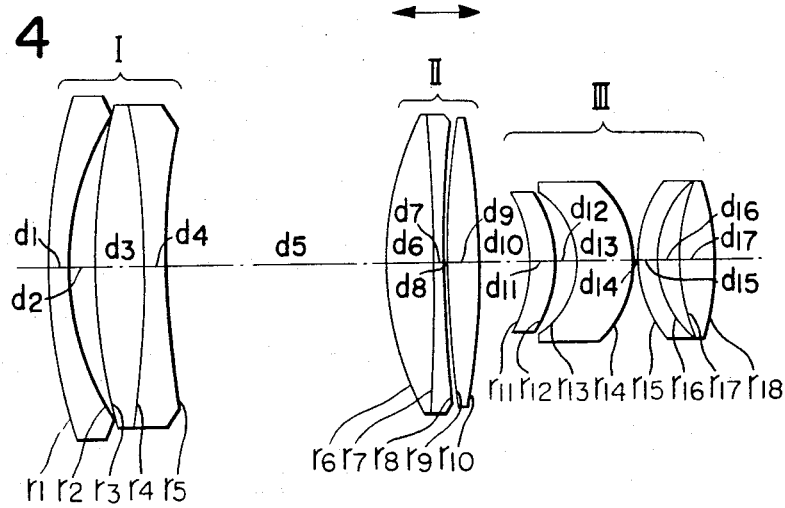
FIG. 4 shows the first example of the component diagrams of the variable magnification lens system of the present invention.
Figure 5:
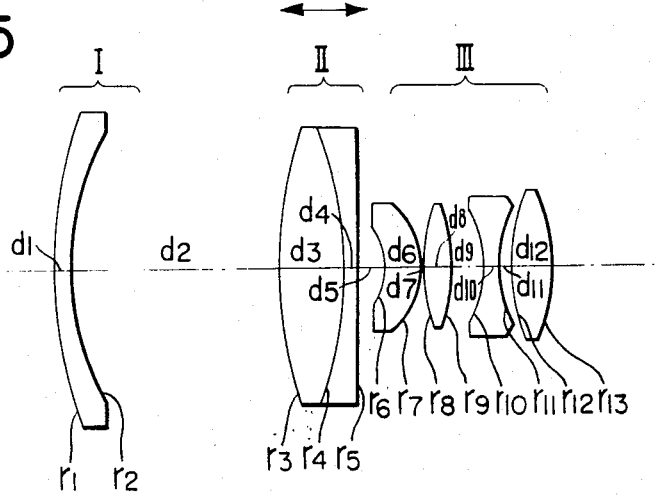
FIG. 5 shows the second example of the component diagrams of the variable magnification lens system of the present invention.

What is claimed is:

1. A lens system with a front end for focusing at a distance $s_1$ from the front end with a magnification $zF$ and at a second distance $s_2$ from the front end of the lens system with a focal length F, said lens system comprising a first lens group at the front of the lens system, a second lens group and a third lens group, said lens groups lying along a common optical axis, said first and third lens groups having substantially fixed positions, said second lens groups being displaceable along the axis a distance $\xi_o$, the first lens group having a focal length $f_1$ and the second lens group having the focal length $f_2$, said lens system satisfying the equations:

$$-\frac{1}{s_2} + \frac{1}{x+y} = \frac{1}{f_1} \quad |f_1| = \frac{\left(\xi_0 + f_2 \frac{1+K}{K} - 1_n\right)s_1}{s_1 + f_2 \frac{1+K}{K} + \xi_0 - 1_n}$$

$$K = 1/\sqrt{z}$$

$$y = f_2 (1-K)^2/K$$

wherein $l_n$ is the interval between the principal points of the first and second lens groups at the focal length $zF$, $x$ is the distance from the first principal point of the first lens group to the point of the image formed by the object at the distance $s_1$ by the first lens group at the focal length F.

2. The system as in claim 1, wherein said first and second and third lens groups have respective dispersive, collective, and collective refraction powers arranged in that order from the object, said third lens group being a fixed position relay lens group.

3. A two point focus variable magnification lens system which comprises three lens groups having respectively dispersive, collective and collective refraction powers arranged in order from the object side, the first lens group being fixed as a rule, the second lens group being movable so as to vary the magnification, and the third lens group being a fixed position relay lens, and which satisfies the following several dimensions:

r: Radii of curvatures of the refraction surfaces in sequence d: Axial widths or air distances of the lens components in sequence N: Refractive indices of the glasses of the lens components in sequence V: Abbe's number of the same glasses as above in sequence Focal length: $f = 17.5$mm (Object distance: $s_1 = 0.8$ m)

$f = 25.1$mm (Object distance: $s_2 = 0.4$m)

Variation ratio of magnification: $= 1.45$

Aperture ratio $= 1 : 2$ $r_1 = 64.018$
     $d_1 = 2.0$      $N_1 = 1.62041$   $V_1 = 60.2$
$r_2 = 30.422$
     $d_2 = 2.0$
$r_3 = 65.643$
     $d_3 = 4.5$      $N_2 = 1.65844$   $V_2 = 50.8$
$r_4 = -87.374$
     $d_4 = 2.0$      $N_3 = 1.74000$   $V_3 = 28.2$
$r_5 = 90.547$
     $d_5 = $ variable
$r_6 = 37.646$
     $d_6 = 4.0$      $N_4 = 1.62230$   $V_4 = 53.1$
$r_7 = -366.922$
     $d_7 = 1.0$      $N_5 = 1.74077$   $V_5 = 27.7$
$r_8 = 123.847$
     $d_8 = 0.2$
$r_9 = 82.098$
     $d_9 = 3.0$      $N_6 = 1.51633$   $V_6 = 64.0$
$r_{10} = -82.577$
     $d_{10} = $ variable
$r_{11} = -13.258$
     $d_{11} = 2.5$      $N_7 = 1.71300$   $V_7 = 53.1$
$r_{12} = -11.280$
     $d_{12} = 2.0$
$r_{13} = -7.888$
     $d_{13} = 5.0$      $N_8 = 1.78472$   $V_8 = 25.6$
$r_{14} = -10.078$
     $d_{14} = 0.2$
$r_{15} = 11.548$
     $d_{15} = 2.0$      $N_9 = 1.73500$   $V_9 = 49.7$
$r_{16} = 9.466$
     $d_{16} = 2.0$
$r_{17} = 27.672$
     $d_{17} = 2.5$      $N_{10} = 1.67790$   $V_{10} = 50.6$
$r_{18} = -51.809$ Said variable air distance being:

When $f = 17.5$      $d_5 = 20.803$,      $d_{10} = 4.5$
When $f = 25.1$      $d_5 = 4.263$,      $d_{10} = 21.040$ 4. A two point focus variable magnification lens system which comprises three lens groups having respectively dispersive, collective and collective refraction powers arranged in order from the object side, the first lens group being fixed as a rule, the second lens group being movable so as to vary the magnification, and the third lens group being a fixed position relay lens, and which satisfies the following several dimensions:

r: Radii of curvatures of the refraction surfaces in sequence d: Axial widths or aid distances of the lens components in sequence N: Refractive indices of the glasses of the lens components in sequence V: Abbe's numbers of the same glasses as just above in sequence Focal length $f = 17.5$mm (Object distance: $s_1 = 0.8$ m)

$f = 25.32$mm (Object distance: $s_2 = 0.4$ m)

Variation ratio of magnification $= 1.45$

Aperture ratio $= 1 : 2.8$ $r_1 = 43.605$
     $d_1 = 1.5$      $N_1 = 1.62004$   $V_1 = 36.3$ $r_2 = 25.3206$
$\quad d_2 =$ variable
$r_3 = 34.6907$
$\quad d_3 = 6.0 \quad\quad N_2 = 1.69100 \ V_2 = 54.8$
$r_4 = -32.719$
$\quad d_4 = 1.4 \quad\quad N_3 = 1.59270 \ V_3 = 35.6$
$r_5 = -490.6$
$\quad d_5 =$ variable
$r_6 = -5.7813$
$\quad d_6 = 3.3 \quad\quad N_4 = 1.72825 \ V_4 = 28.5$
$r_7 = -7.682$
$\quad d_7 = 0.2$
$r_8 = 16.579$
$\quad d_8 = 2.5 \quad\quad N_5 = 1.71300 \ V_5 = 54.0$
$r_9 = -19.4325$
$\quad d_9 = 3.2$
$r_{10} = -11.067$
$\quad d_{10} = 1.5 \quad\quad N_6 = 1.72825 \ V_6 = 28.5$
$r_{11} = 11.577$
$\quad d_{11} = 0.85$
$r_{12} = 15.839$
$\quad d_{12} = 3.9 \quad\quad N_7 = 1.62041 V_7 = 60.13$
$r_{13} = -15.839$ Said variable air distance being:

When $f = 17.5$ $\quad d_2 = 19.740 \quad\quad d_5 = 5.0$
When $f = 25.32$ $\quad d = 4.303, \quad\quad d = 20.437$ 5. A two point focus variable magnification lens system in which only the second lens group is movable and focussing on one object at one fixed distance from the lens system is performed when the second lens group is at its first position, and focussing on another object at a shorter fixed distance from the lens system when the second lens group is at its second position, the object being at the minimum focal length from the lens system when focussing at the longer fixed distance from the lens system, and the object being at the maximum focal length when the focussing is at the shorter fixed distance from the lens system, said lens systems satisfying equations $$-\frac{1}{s_2} + \frac{1}{x+y} = \frac{1}{f_1} \quad |f_1| = \frac{\left(\xi_0 + f_2 \frac{1+K}{K} - 1_n\right) s_1}{s_1 + f_2 \frac{1+K}{K} + \xi_0 - 1_n}$$

wherein $f_1$ is the focal length of the first lens group, $f_2$ is the focal length of the second lens group, $s_1$ is the one fixed distance to the farther object from the front end of the lens system at the minimum focal length, $s_2$ is the other fixed distance to the object to the front end of the lens system, $\xi_0$ is the displacement length of the second lens group, $K = 1/\sqrt{z}$ where $z$ is the variation ratio of magnification, $l_m$ is the interval between the principal points of the first and second lens groups at the maximum focal length, $x$ is the distance from the front principal point of the first lens group to the point of the image formed of a further object by the first lens group at the minimum focal length, and $y$ is $f_2 (1-K)^2/K$.

6. The two point focus variable magnification lens system as set forth in claim 5, wherein the lens system comprises three lens groups having respectively dispersive, collective and collective refraction powers arranged in that order from the object side, the first lens group being fixed, the second lens group being movable so as to vary the magnification and the third lens group being a fixed position relay lens group.

7. A video-telephone system, comprising means for transmitting and receiving video-telephone images, a lens system for alternately focussing upon the head and shoulders of one subscriber and also alternately focussing upon documents closer to the lens system, said lens system including a first lens group and a second lens group and a third lens group arranged along an optical axis, the head and shoulders of a subscriber being anticipated to be a distance $s_1$ from the front end of the lens system, the document being anticipated to be a distance $s_2$ from the front end of the lens system, the lens system requiring a magnification $zF$ for producing images to be transmitted of the head and shoulders of the subscriber, the lens system requiring a magnification F for transmitting images of the document, said lens system satisfying the equations $$-\frac{1}{s_2} + \frac{1}{x+y} = \frac{1}{f_1} \quad |f_1| = \frac{\left(\xi_0 + f_2 \frac{1+K}{K} - 1_n\right) s_1}{s_1 + f_2 \frac{1+K}{K} + \xi_0 - 1_n}$$

$$K = 1/\sqrt{z}$$
$$y = f_2 (1-K)^2/K$$

where $\xi_0$ is the displacement length of the second lens group, $l_n$ is the interval between the principal points of the first and second lens groups at the focal length $zF$, $x$ is the distance from the first principal point of the first lens group to the point of the image formed by the object at the distance $s_1$ by the first lens group at the focal length F.

8. An apparatus as in claim 7, wherein said first and second and third lens groups have respective dispersive, collective, and collective refraction powers arranged in that order from the object, said third lens group being a fixed position relay lens group, said first and third lens groups being substantially fixed relative to each other, said second lens group being movable only to between two positions defining the focal lengths $zF$ and F.

* * * * *